United States Patent [19]

Hanson

[11] Patent Number: 4,555,945

[45] Date of Patent: Dec. 3, 1985

[54] METHOD AND APPARATUS FOR PRODUCING A CONTROLLED PRELOAD ON A TRANSDUCER ASSEMBLY BY MEANS OF A COMPOSITE MATERIAL SLEEVE

[75] Inventor: Richard A. Hanson, Woodinville, Wash.

[73] Assignee: Sundstrand Data Control, Inc., Redmond, Wash.

[21] Appl. No.: 605,867

[22] Filed: May 1, 1984

[51] Int. Cl.$^4$ .................. B23P 15/13; G01P 11/02
[52] U.S. Cl. .................. 73/517 B; 29/25.41; 29/446; 29/447; 29/450; 29/602 R; 73/431
[58] Field of Search .......... 73/517 R, 517 B, 517 AV, 73/75 G, 431; 29/25.41, 446, 447, 450, 602

[56] References Cited

U.S. PATENT DOCUMENTS

| | | |
|---|---|---|
| 3,152,485 | 10/1964 | Lones et al. |
| 3,339,419 | 9/1967 | Wilcox |
| 3,673,873 | 7/1972 | Estes et al. |
| 3,702,073 | 11/1972 | Jacobs |
| 3,792,526 | 2/1974 | Bremseth ................. 29/602 |
| 4,169,309 | 10/1979 | Meginnis ................. 29/447 |

Primary Examiner—S. Clement Swisher
Attorney, Agent, or Firm—Christensen, O'Connor, Johnson & Kindness

[57] ABSTRACT

A transducer assembly includes first and second stators which are axially aligned with, and bear upon opposite sides of a proof mass. The stators and proof mass are clamped together by means of a sleeve having a side portion with upper and lower flanges projecting therefrom. An inner sleeve element, formed from a material having a different coefficient of thermal expansion than the side portion, is disposed between the flanges. The temperature of the sleeve is controlled such that the inner sleeve element produces a tensile stress on said flanges, increasing the spacing therebetween. The flanges are then joined to the stators. Thereafter, the temperature of the sleeve is controlled such that the tensile stress produced by the inner sleeve element on the flanges is reduced producing a compression force tending to reduce the flange spacing. This compression force is transmitted to the stators and proof mass as a controlled compressive axial preload.

35 Claims, 6 Drawing Figures

METHOD AND APPARATUS FOR PRODUCING A CONTROLLED PRELOAD ON A TRANSDUCER ASSEMBLY BY MEANS OF A COMPOSITE MATERIAL SLEEVE

BACKGROUND OF THE INVENTION

The present invention pertains to the transducer art and, more particularly, to a method of, and means for producing a controlled preload on a transducer assembly.

Transducer assemblies commonly comprise one or more mating sections which, in final assembly, are clamped together by suitable means. In many transducer configurations, this clamping force can lead to offsets in the transducer sensing elements. A particular example of such a transducer is an accelerometer assembly of the type described in U.S. Pat. No. 3,702,073, invented by Jacobs, issued Nov. 7, 1972, and assigned to the same assignee as the present application. This design is comprised of three primary components, namely, a proof mass assembly which is supported between upper and lower stators. The proof mass assembly includes a movable flapper, or reed, which is cantilevered from an outer annular support member via flexure elements. The flapper and outer annular support member are commonly provided as a unitary, fused quartz piece.

Arcuate capacitor pick-off plates are formed on the upper and lower surfaces of the flapper by means of gold deposition. In addition, upper and lower force-restoring, or torquer coils are mounted to the upper and lower surfaces of the flapper. Each torquer coil is wound on a cylindrical core and is positioned on the flapper such that the longitudinal axis of the cylinder coincides with a line that extends through the center, and is normal to the top and bottom surfaces of the proof mass assembly.

Each stator is generally cylindrical, having a bore provided through its planar surface. Contained within the bore is a permanent magnet. The bore and permanent magnet are configured such that the torquer coil of the proof mass assembly fits within the bore, with the permanent magnet being positioned within the cylindrical form of the torquer coil. Thus, each stator permanent magnet is in magnetic circuit configuration with a magnetic field as produced by a current flowing through the corresponding torquer coil. Also provided on the planar surface of the stators are capacitive plates configured to form capacitors with the upper and lower capacitor pick-off plates on the proof mass assembly. Thus, movement of the flapper with respect to the upper and lower stators results in a differential capacitance change between the capacitors formed at the upper and lower surfaces of the flapper.

In operation, the accelerometer assembly is affixed to the object to be monitored. Acceleration of the object results in pendulous, rotational displacement of the flapper with respect to the outer annular support member and the upper and lower stators. The resulting differential capacitance change caused by this displacement may be sensed by suitable circuitry. The circuitry then produces a current which, when applied to the torquer coils, tends to return the flapper to its neutral position. The magnitude of the current required to "restore" the flappers is directly related to the acceleration of the accelerometer.

Accelerometers of the type described in the Jacobs patent are susceptible to bias errors due to stresses created between the stators and the proof mass assembly. These stresses may be transmitted through the outer annular support member to the flexure elements, resulting in a strain thereof and a corresponding deflection of the flapper. This offset is sensed by the associated circuitry, which responds by producing a current through the torquer coils to reposition the flapper. Such correction current represents a bias current error to the accelerometer's output reading.

One source of such offset bias producing stress is found in the means used to clamp, or secure the transducer assembly together. Commonly, the stators and proof mass assembly are held in axial alignment and a bellyband is positioned around the exposed edge of the proof mass and cemented to the upper and lower stators. In one prior art construction, bolts secured the assembly together providing an axial preload, with a bellyband being used for lateral support.

The problem with bellyband-type securing means is that they are subject to hoop stress due to the difference in the coefficient of thermal expansion between the stator material, the bellyband material, and the cement used to secure the band to the stators. As a result, a change in temperature of the transducer creates strains between the cement (typically epoxy) and the band and stator elements (typically a metal alloy). Where the assembly utilizes bolts, expansions and contractions of the bolts relative to the transducer assembly similarly create undesired stresses.

In transducer designs, it is desirable, therefore, particularly in high accuracy applications, to provide a means for preloading the transducer elements in a manner that is stable with temperature, time, and other environmental influences.

SUMMARY OF THE INVENTION

The present invention is directed to a method of, and an apparatus for producing a stable, controlled preload on a transducer assembly.

Briefly, according to the invention, a method for producing a controlled preload between the first and second mating sections of a transducer assembly comprises the initial step of providing a sleeve member, the sleeve member having a side portion with predeterminedly spaced apart upper and lower flanges projecting therefrom. Each flange is configured to be joined with one of the mating sections. The side portion is formed of a first material having a first coefficient of thermal expansion. The sleeve member further includes an inner sleeve element disposed intermediate the flanges and having a predetermined spacing with respect to the flanges. The inner sleeve element is formed of a second material having a second coefficient of thermal expansion. The temperature of the sleeve member is then controlled such that the inner sleeve element exerts a tensile stress on the flanges increasing the spacing therebetween. Each flange is then joined to one of the first and second mating sections. Finally, the temperature of the sleeve member is controlled such that the tensile stress on the flanges is reduced thereby producing a compression force on the flanges tending to reduce the spacing therebetween. This compression force is transmitted to the first and second mating sections to produce a predetermined compressive preload therebetween.

In one construction of the invention, the inner sleeve element is formed from a material having a higher coefficient of thermal expansion than the sleeve member side portion. The inner sleeve element is dimensioned such that at a first temperature the inner sleeve element exerts a relatively high tensile stress on the flanges, whereas at a second, reduced temperature the inner sleeve exerts a relatively low tensile stress on the flanges. The sleeve member is then heated to the first temperature producing the tensile stress on the flanges increasing the spacing therebetween. After each flange is joined with a mating section, the sleeve member is cooled to the second temperature, thereby producing a compression force on the flanges which is transmitted to the mating sections as a compressive preload.

The inner sleeve element may be formed of a memory alloy which is preformed to a dimension such that it exerts a relatively low tensile stress on the flanges at the second temperature, whereas at an elevated memory temperature the inner sleeve element exerts a relatively high tensile stress on the flanges. In this construction, the sleeve member is heated to said memory temperature to produce tensile stress on the flanges increasing the spacing therebetween.

Alternatively, the inner sleeve element may be formed of a memory alloy having a lower coefficient of thermal expansion than the sleeve member side portion. The memory alloy is preformed to exert a relatively high tensile force on the flanges at a first temperature, whereas at a second, elevated memory temperature the inner sleeve element exerts relatively low tensile force on the flanges. Tension is applied to the flanges, as by heating, to increase the spacing therebetween and the preformed inner sleeve element, at said first temperature, is then inserted to maintain the flange spacing. The flanges are then joined with the mating sections and the assembly is heated to the memory temperature, selected to be above the highest operating temperature of the transducer. At the memory temperature the inner sleeve element contracts, whereby upon cooling of the assembly a compressive preload is produced between the flanges.

Transducer assembly apparatus comprises a sensor assembly having first and second axially aligned mating sections, with each mating section having a receiving surface for receiving an applied force to clamp the mating sections together. A clamping means applies a controlled compressive preload to the mating sections. The clamping means comprises a sleeve member having a side portion with predeterminedly spaced apart upper and lower flanges projecting therefrom. Each flange is configured to be joined with one of the mating section receiving surfaces. The side portion is formed of a first material having a first coefficient of thermal expansion and the sleeve member further includes an inner sleeve element, disposed intermediate said flanges, and formed of a second material having a second coefficient of thermal expansion. The flanges are joined to the mating section receiving surfaces at a first temperature such that the inner sleeve element exerts a tensile stress on the flanges predeterminedly increasing the spacing therebetween. The sleeve member thereafter is controlled to a second temperature such that the tensile stress on the flanges is reduced thereby producing a compression force on the flanges tending to reduce the spacing therebetween, this compression force being transmitted to the first and second mating sections to produce a predetermined preload therebetween.

In one construction of the transducer assembly apparatus, the inner sleeve element is formed from a material having a higher coefficient of thermal expansion than that of the side portion. The inner sleeve element is dimensioned such that at the first temperature the inner sleeve exerts a relatively high tensile stress on the flanges whereas at a second, reduced temperature the inner sleeve element exerts a relatively low tensile stress on the flanges.

DETAILED DESCRIPTION

Figures 1, 2:
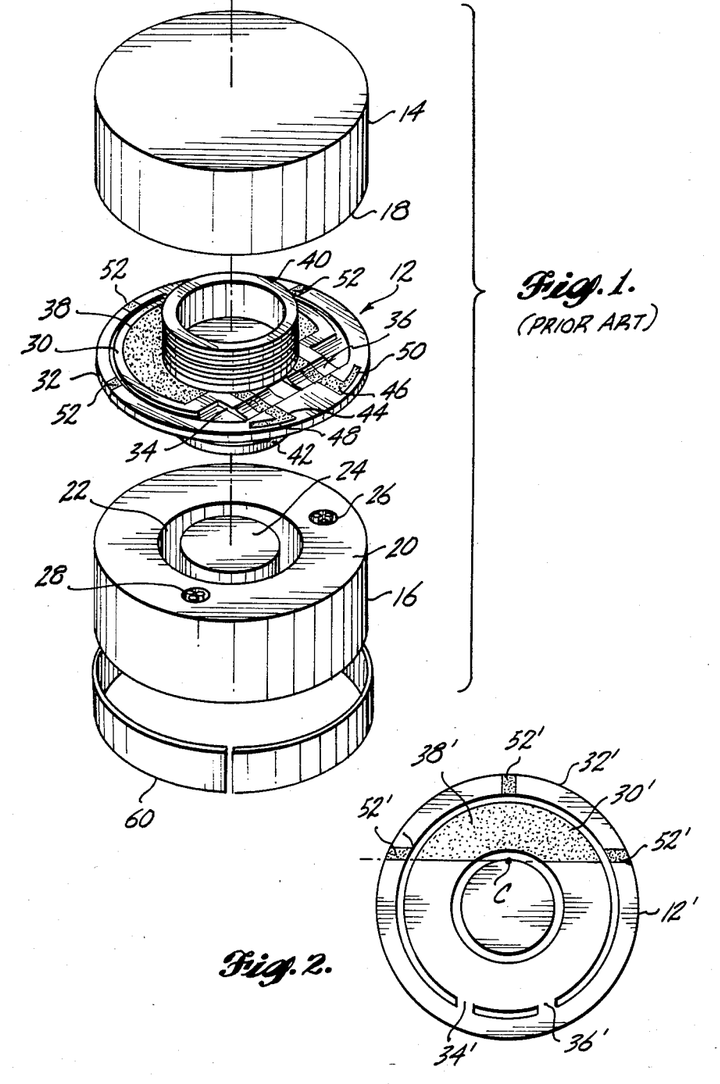
FIG. 1 is an exploded, perspective view illustrating a prior art accelerometer construction.
FIG. 2 is a top, plan view of an improved prior art proof mass assembly for use in a transducer as shown in FIG. 1.

FIG. 1 is an exploded view of an accelerometer of the general type described in U.S. Pat. No. 3,702,073 to Jacobs. Here, an accelerometer, indicated generally at 10, is comprised of three primary components, namely, a proof mass assembly, indicated generally at 12, and upper and lower stator, or magnet units 14, 16, respectively. The stators 14, 16 are cylindrical, having planar surfaces 18, 20, respectively, which are adapted to abuttingly mate with provided portions of proof mass assembly 12. A bore, such as bore 22, is provided in the central portion of each stator 14 and 16, such that a centrally located permanent magnet may be affixed or formed therein. The bore 22 of lower stator 16 is shown receiving a cylindrical permanent magnet 24, whereas the corresponding bore and permanent magnet of the upper stator are not shown. Electrical contact posts 26, 28 are positioned within bores that are spaced-apart from one another in the planar surface 20 of the lower stator 16. Upon assembly of the accelerometer, the contact posts 26, 28 provide electrical connections to contact pads on the proof mass assembly.

The proof mass assembly 12 is comprised of a mass element, commonly called a flapper or reed 30. Flapper 30 is generally circular and is connected to an outer annular support member 32 through a pair of flexure elements 34, 36. The flapper 30, outer annular support member 32 and flexure elements 34, 36 are, preferably, formed as a unitary, fused quartz piece.

An arcuate capacitor pick-off plate 38 is formed, as by gold deposition, on the upper surface of flapper 30. A corresponding capacitor pickoff plate (not shown) extends arcuately along the outer periphery of the lower surface of flapper 30.

A pair of torquer coils 40, 42 mount to the upper and lower surfaces, respectively, of the flapper 30. Each torquer coil is comprised of multiple windings of copper wire on a cylindrical core. The torquer coils 40, 42 are mounted to the flapper 30 such that the longitudinal axis of each torquer core is coincident with a line extending through the center of the proof mass assembly 12, and normal to the upper and lower surfaces of the flapper 30. Electrical connections to the capacitor pick-off plates, such as plate 38, and to the upper and lower torquer coils 40, 42 are provided by thin film pick-off leads 44, 46 which extend over the flexure elements 34, 36 to contacting pads 48, 50 formed on the outer annular support member 32.

A series of contact pads 52 are formed at spaced angular intervals around the upper surface of the outer annular support member 32. Corresponding contact pads (not shown) are formed on the lower surface of support member 32. The contact pads are, typically, formed by acid etch.

Upon assembly of the accelerometer 10, the proof mass assembly 12 is supported between the upper and lower stators 14, 16, respectively, at contact points defined by the contact pads 52.

Also, assembly of the accelerometer 10 forms a capacitor pair. The first capacitor has spaced-apart, substantially parallel plates comprised of the upper capacitor pick-off plate 38 and the planar surface 18 of the upper stator 14. The second capacitor is formed by the capacitor pick-off plate that is located on the lower surface of the flapper (not shown) and the planar surface 20 of the lower stator 16. Deflection of the flapper 30 with respect to the outer annular support 32 and the planar surfaces 18, 20 of the upper and lower stators 14, 16 produces a differential change in the capacitance of these two capacitors.

Assembly of the accelerometer 10 also results in the torquer coils 40, 42 being coaxially received within annular cavities formed between the permanent magnets, such as magnet 24, and the wall of the bores, such as bore 22.

In final assembly of the accelerometer 10 shown in FIG. 1, an axial force applied at opposite ends of the stators 14, 16 causes the bearing surfaces 18, 20 thereof to bear upon the contact pads 52 of the proof mass assembly 12. A bellyband 60 is then positioned around the outer cylindrical surface of the assembly 10, the bellyband 60 being centered with respect to the edge of the proof mass assembly 12. A suitable cement, such as epoxy, is affixed to the edges of the band and the corresponding adjacent portions of the stators 14, 16, to thereby secure the stators 14, 16 and proof mass 12 together as a unit.

In operation, the accelerometer 10 is affixed to the object to be monitored with its sensitive axis 70 aligned with the axis to be measured. Acceleration of the object results in a pendulous, rotational displacement of the flapper 30 with respect to the outer annular support member 32 and the stators 14 and 16, with resultant differential change in the capacitance of the two capacitors. The change in capacitance is sensed by suitable sense circuitry (not shown) which, in the known servo manner, produces a current which is passed to the windings of the torquer coils 40, 42. This current results in a magnetic field which, in combination with the stator permanent magnets, such as magnet 24, produces a force tending to "restore" the flapper 30 to its rest position. The current through coils 40, 42 is directly related to the acceleration of the accelerometer and, as such, may be used to produce an appropriate acceleration reading.

As discussed above, the prior art accelerometer design of FIG. 1 is subject to an offset bias error due to differences in material characteristics between the cement, bellyband 60 and stators 14, 16. More specifically, the coefficient of thermal expansion of the cement, which is normally an epoxy, is different than the coefficient of thermal expansion of the metal alloy used to form the band 60 and stators 14, 16. As such, thermal stresses created between the cement, band 60 and the stators 14, 16 are transmitted to the outer annular support member 32 through the pads 52. These transmitted stresses may result in a strain on the flexure elements 34, 36 and a corresponding deflection of the flapper 30. Such deflection by the flapper 30 is sensed by the servo detector circuitry (not shown) which responds by producing a current through the torquer coils 40, 42 thereby tending to reposition the flapper 30. The resultant position change of flapper 30 causes flexures 34, 36 to produce an opposing moment thereby creating a bias offset error current in the accelerometer's output. As described below, the present invention is directed to methods of, and means for substantially reducing, or eliminating such sources of offset bias error by providing a controlled transducer preload which is stable with respect to temperature, time and other environmental influences.

The present invention is particularly suitable for inclusion of an improvement to the accelerometer 10 of FIG. 1 which is described in U.S. Pat. No. 4,250,757, invented by Hanson, issued Feb. 17, 1981, and assigned to the same assignee as the present invention. As described in that patent, and with reference to FIG. 2, bias errors of the type described above with reference to the accelerometer of FIG. 1 may be reduced if the contact pads on the outer annular support of the proof mass assembly are aligned on an axis that extends through the centroid of the capacitor pick-off plate.

Thus, with reference to FIG. 2, the proof mass assembly 12' includes a flapper 30' which is suspended from an outer annular support member 32' by means of a pair of flexure elements 34', 36'. An arcuate capacitor pick-off plate 38' is formed, as by gold deposition, on one side of flapper 30'. The corresponding capacitor pick-off plate (not shown) extends arcuately along the outer periphery of the lower surface of flapper 30'.

A series of contact pads 52' are formed at spaced angular intervals around the upper surface of the outer annular support member 32'. Corresponding contact pads (not shown) are formed on the lower surface of support member 32'.

A particular feature of the proof mass assembly 12' shown in FIG. 2 is that the lower edges of opposing contact pads 52' are on an axis which extends through the centroid C of the area defined by capacitor pick-off plate 38'. By locating the pads 52' in this manner, motion of the centroid C of the pick-off element 38' parallel to the sensitive axis (i.e., longitudinal axis) of the accelerometer 10 of FIG. 1 due to stress induced in the outer annular support 32' by clamping the stators 14, 16 together will be significantly reduced. This reduction is due to the fact that rotation of the flapper 30' about the centroid C of the pick-off area will produce equal pick-off effects on either side of the axis of rotation, thereby tending to cancel pick-off errors due to stress in the flexures 34', 36'.

Figure 3:
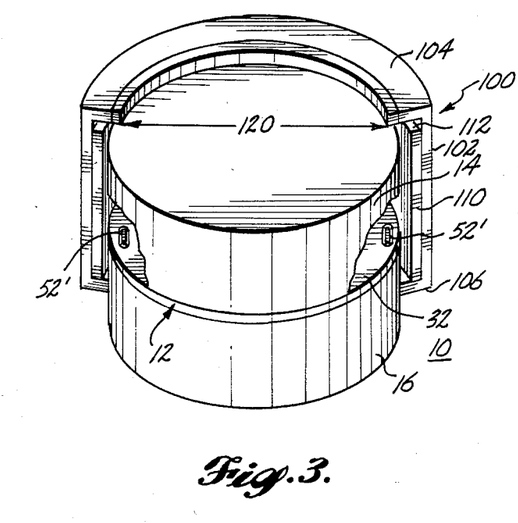
FIG. 3 is a perspective view illustrating the transducer assembly of FIG. 1 secured by the clamping means of the present invention.

FIG. 3 is a perspective view illustrating the transducer assembly 10, wherein the stators 14, 16 are axially aligned with, and bearing upon the contact pads 52 of the outer support member 32 of proof mass assembly 12.

The present invention is directed to a method of, and means for applying an axial compression force to the transducer assembly 10, thereby clamping the stators 14, 16 and proof mass assembly 12 together. The clamping means includes a sleeve member, indicated generaly at 100, which has a side portion 102 with upper and lower flanges 104, 106, respectively, projecting therefrom. The upper and lower flanges 104, 106, are predeterminedly spaced apart, as will be described hereinbelow. The side portion 102 is arcuate, having a radius equal to the radius of the outer cylindrical surface of the transducer assembly 10. The upper and lower flanges 104, 106, respectively, project to the concave side of arcuate side portion 102.

An inner sleeve element 110 is arcuate, having the same radius as the sleeve member side portion 102. Inner sleeve element 110 is disposed between upper and lower flanges 104, 106 and is attached by cement, or other suitable means to the concave face of side portion 102. The axial extent of inner sleeve portion 110 is designed such that, at the operating temperature of the transducer assembly 10, there is a finite gap 112 between the upper extent of the inner sleeve member 110 and the inside face of the upper flange 104.

Figure 5:
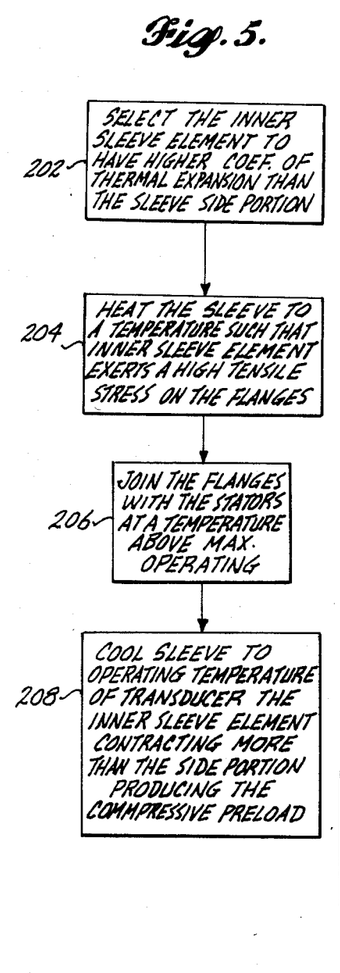
FIG. 5 is a flow diagram detailing one method for producing a preload on the assembly of FIGS. 3 and 4.
Figure 6:
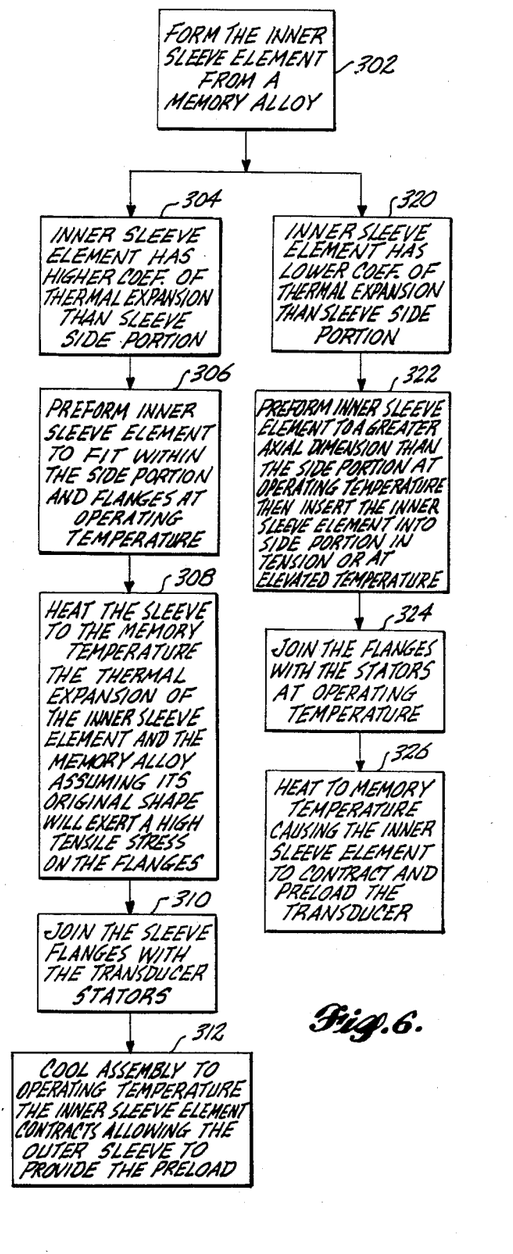
FIG. 6 is a flow diagram illustrating alternative methods for producing a preload on the transducer assembly of FIGS. 3 and 4.

The arcuate extent of the sleeve member 100 is defined by a chord 120. In the preferred embodiment of the invention, the chord 120 is selected such that the clamping force which is transmitetd from the sleeve member 100 to the transducer assembly 10, in a manner described in detail with respect to FIGS. 5 and 6, is transmitted axially through stators 14, 16 to the contact pads 52 which are positioned on an axis extending through the centroid of the capacitive pick-off plate areas provided on opposite surfaces of the mass element (FIG. 2). By so configuring the sleeve element 100, any fluctuation in stress created between the sleeve element 100 and the transducer assembly 10 is transmitted axially to the centroid aligned pads 52. In this way, any preload variance transmitted from the sleeve member 100 to the transducer assembly 10 produces a minimal offset bias current in the associated circuity (not shown) due to the fact that the change in differential capacitance between the capacitive pick-off areas and the corresponding stator plate areas is minimized.

Figure 4:
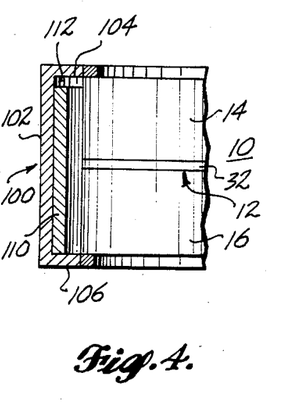
FIG. 4 is a cross-sectional, side view of the transducer assembly and clamping means shown in FIG. 3.

FIG. 4 is a partial cross-sectional side view of the transducer assembly 10 and sleeve member 100 as shown in FIG. 3. Shown are the upper and lower stators 14, 16 which are axially aligned with, and bear upon the contact pads (not shown) of the outer support member 32 of proof mass 12. The sleeve member 100 is comprised of a side portion 102 having upper and lower flanges 104, 106, respectively, projecting therefrom. An inner sleeve member 110 is affixed to the concave face of arcuate side member 102. At the normal operating temperature of the transducer assembly 10, a gap 112 is formed between the axial extent of the inner sleeve member 110 and the lower face of upper flange 104.

The basic method for attaching the sleeve member 100 to the transducer assembly 10 involves the first step of controlling the temperature of sleeve member 100 such that the inner sleeve member 110 exerts a tensile stress on upper and lower flanges 104, 106, respectively, increasing the spacing therebetween. The flanges are then joined with corresponding receiving surfaces on the stators 14, 16. Thereafter, the temperature of the sleeve element 100 is controlled to a temperature such that the tensile stress exerted by the inner sleeve member 110 on the upper and lower flanges 104, 106 is reduced, thereby producing a compression force on the flanges 104, 106 tending to reduce the spacing therebetween. This compression force is transmitted to the stators 14, 16 thereby producing a predetermined compressive preload between the stators 14, 16 and the outer annular support member 32 of proof mass 12.

Alternative approaches to providing the above construction are given in FIGS. 5 and 6.

Referring to FIG. 5, which is a flow diagram illustrating sequential steps for producing the preloaded transducer assembly of FIGS. 3 and 4, at 202 an inner sleeve element is selected having a higher coefficient of thermal expansion than the side portion 102 of sleeve member 100. The sleeve member 100 is then heated, at 204, to a temperature such that the inner sleeve element 110 expands and exerts a relatively high tensile stress on the flanges 104, 106, increasing the spacing therebetween. At 206, the flanges 104, 106 are then joined with the stators. This may be accomplished by attaching the flanges 104, 106 to the stators 14, 16 with a cement, such as epoxy, or, as shown in FIG. 3, the flanges 104, 106 may be positioned over the upper and lower receiving surfaces of the transducer assembly in postion to bear thereon.

At 208, the sleeve 100 is cooled to within the operating temperature of the transducer. At this temperature, the inner sleeve element 110 has contracted sufficiently such that it exerts a reduced tensile stress on the flanges 104, 106. This reduced tensile stress results in a compressive force on the flanges 104, 106 tending to reduce the spacing therebetween. The compressive force is transmitted to the stators 14, 16 and the outer annular support 32 of the proof mass 12 as an axial, compressive preload.

FIG. 6 is a logic flow diagram illustrating alternative steps for assembling the transducer assembly and clamping means of FIGS. 3 and 4.

At 302, the inner sleeve element 110 is formed from a memory alloy. Memory alloys may be plastically deformed at one temperature, yet they will completely recover to their original shape upon being raised to a higher, "memory" temperature. Numerous memory, or marmen, alloys are known to the art including alloys of iron-platinum, indium-cadmium, iron-nickel, nickel-aluminum, stainless steel, nickel-titanium and copper-zinc-aluminum. The choice of a particular memory alloy for forming sleeve element 110 is dependent upon the specific application and includes factors such as the suitability of a particular alloy to the working environment, cost and so forth.

At 304, the inner sleeve element 110 memory alloy is selected to have a higher coefficient of thermal expansion than the side portion 102 of sleeve member 100. The inner sleeve element 110 is preformed, at 306, to fit within, and exert a relatively low tensile stress upon the side portion 102 and flanges 104, 106 at the operating temperature of the transducer assembly.

At 308, the sleeve 100 is heated to the memory temperature of the memory alloy. As a result, both the thermal expansion of the inner sleeve element 110 along with the memory alloy assuming its original shape creates a high tensile stress on the flanges 104, 106 increasing the spacing therebetween. The sleeve flanges 104, 106 are then joined with the stators 14, 16 of the transducer assembly 10, at 310. The flanges 104, 106 may be cemented, as by epoxy, to the stators 14, 16 or as shown in the embodiment of FIG. 3, the spacing between the flanges 104, 106 under the influence of a high tensile stress from the inner sleeve element 110 may be selected such that the flanges 104, 106 fit over the upper and lower receiving surfaces of the stators 14, 16, allowing the flanges 104, 106 to bear upon these surfaces.

At 312, the transducer assembly 10 is then cooled to within its operating temperature, the inner sleeve element contracting and producing a reduced, or zero tensile stress on the flanges 104, 106 thereby producing a compressive preload which is transmitted to the stators 14, 16 and the outer support member 32 producing an axial, compressive preload therebetween.

At 320, the inner sleeve element 110 memory alloy is formed of a material having a lower coefficient of thermal expansion than that of the side portion 102 of sleeve 100. The inner sleeve element 110 is preformed, at 322, to a greater axial dimension than the side portion 102 at the operating temperature of the transducer assembly 10. The spacing between the flanges 104, 106 is then increased, either by an applied tension or by elevating the temperature of the sleeve side portion 102, such that the inner sleeve element 110 may be inserted between the flanges 104, 106.

At 324, the flanges 104, 106 are joined with the stators 14, 16 with the sleeve 100 at the normal operating temperature of the transducer. As before, the flanges 104, 106 may be joined to the stators 14, 16 by means of a cement, or by providing the spacing between the flanges, under the tensile stress afforded by the inner sleeve element 110, such that the flanges fit over, and bear upon the upper and lower surfaces of the stators 14, 16.

The assembly is then heated to the memory temperature at 326, causing the inner sleeve element 110 to contract, thereby producing a compressive force on the flanges 104, 106, which compressive force is transmitted to the stators 14, 16 and the outer support member 32 of the proof mass assembly 12 producing an axial, compressive preload therebetween.

The clamping means as disclosed herein provides a significant advance over transducer preload and clamping means known to the prior art. The side portion 102 and flanges 104, 106 of the sleeve member 100 may be formed of the same alloy as are the stators 14, 16. As such, the coefficients of thermal expansion of the materials track, thereby minimizing thermally induced stresses between the sleeve member 100 and the transducer assembly 10. It is noted that, within the normal operating range of the transducer assembly 10, a gap 112 is provided between the inner sleeve element 110 and the innerfaces of the flanges 104, 106 whereby the inner sleeve element 110 has a minimal effect on the spacing between the flanges 104, 106 and, thus, the load transmitted to the transducer assembly 10.

In addition, the clamping means disclosed herein may be designed to produce any desired clamping force, this clamping force being uniform from assembly-to-assembly.

While a preferred embodiment of the invention has been described in detail, it should be apparent that many modifications and variations thereto are possible, all of which fall within the true spirit and scope of the invention.

For example, whereas a sleeve member 100 having a pair of projecting flanges 104, 106 has been described, either, or both of the flanges 104, 106 could be of limited extent, being joined in abutting relationship with the side face of a corresponding stator via a weld or other suitable securing means.

The embodiments of the invention in which an exclusive property or privilege is claimed are defined as follows:

1. A method for producing a controlled preload between the first and second mating sections of a transducer assembly, the method comprising the steps of:
   (a) providing a sleeve member, said sleeve member having a side portion with predeterminedly spaced apart upper and lower flanges projecting therefrom, each flange configured to be joined with one of said mating sections, said side portion being formed of a first material having a first coefficient of thermal expansion, said sleeve member further including an inner sleeve element disposed intermediate said flanges and having a predetermined spacing with respect to said flanges, said inner sleeve element being formed of a second material having a second coefficient of thermal expansion;
   (b) controlling the temperature of said sleeve member such that said inner sleeve element exerts a tensile stress on said flanges increasing the spacing therebetween;
   (c) joining each flange to one of said first and second mating sections; and
   (d) controlling the temperature of said sleeve member such that said tensile stress on said flanges is reduced thereby producing a compression force on said flanges tending to reduce the spacing therebetween, said compression force being transmitted to said first and second mating sections to produce a predetermined compressive preload therebetween.

2. The method of Claim 1 wherein said first and second mating sections are generally cylindrical in shape, the sensor assembly being formed by aligning the longitudinal axes of said mating sections, thereby forming a cylindrical outer surface, and applying an axial compression force therebetween,
   wherein step (a) comprises the steps of:
   (i) providing said sleeve member configured such that said side portion is arcuate, having a radius substantially equal to the radius of said cylindrical outer surface,
   (ii) providing said flanges projecting from said side portion into the concave side thereof, the spacing between said flanges being predeterminedly related to the axial length of said aligned mating sections, and
   (iii) providing said inner sleeve element arcuate in shape having substantially the same radius as said side portion, said inner sleeve element being attached to said side portion intermediate said flanges.

3. The method of claim 1 wherein
   step (a) comprises the step of providing said inner sleeve element formed from a material having a higher coefficient of thermal expansion than said side portion, said inner sleeve element being dimensioned such that at a first temperature said inner sleeve element exerts a relatively high tensile stress on said flanges whereas at a second, reduced temperature said inner sleeve exerts a relatively low tensile stress on said flanges;
   step (b) comprises the step of heating said sleeve member to said first temperature; and
   step (d) comprises the step of cooling said sleeve member to said second temperature.

4. The method of claim 2 wherein
   step (a) comprises the step of providing said inner sleeve element formed from a material having a higher coefficient of thermal expansion than said side portion, said inner sleeve element being dimensioned such that at a first temperature said inner sleeve element exerts a relatively high tensile stress on said flanges whereas at a second, reduced temperature said inner sleeve exerts a relatively low tensile stress on said flanges;

step (b) comprises the step of heating siad sleeve member to said first temperature; and step (d) comprises the step of cooling said sleeve member to said second temperature.

5. The method of claim 3 wherein:

step (a) comprises the further step of providing said inner sleeve element formed of a memory alloy, said memory alloy being preformed to a dimension such that said inner sleeve element exerts a relatively low tensile stress on said flanges at said second temperature, whereas at an elevated memory temperature said inner sleeve element exerts a relatively high tensile stress on said flanges; and step (b) comprises the step of heating said sleeve member to said memory temperature.

6. The method of claim 4 wherein:

step (a) comprises the further step of providing said inner sleeve element formed of a memory alloy, said memory alloy being preformed to a dimension such that said inner sleeve element exerts a relatively low tensile stress on said flanges at said second temperature, whereas at an elevated memory temperature said inner sleeve element exerts a relatively high tensile stress on said flanges; and step (b) comprises the step of heating said sleeve member to said memory temperature.

7. The method of claim 1 wherein:

step (a) comprises the step of providing said inner sleeve element formed of a memory alloy having a lower coefficient of thermal expansion than said side portion, said memory alloy being formed to exert a relatively high tensile force on said flanges at a first temperature whereas at a second, elevated memory temperature said inner sleeve element exerts a relatively low tensile force on said flanges, said inner sleeve element, at said first temperature, being disposed intermediate said flanges with said flanges under tension to increase the spacing therebetween; and step (d) comprises the step of controlling the temperature of said sleeve member to said memory temperature.

8. The method of claim 2 wherein:

step (a) comprises the step of providing said inner sleeve element formed of a memory alloy having a lower coefficient of thermal expansion than said side portion, said memory alloy being formed to exert a relatively high tensile force on said flanges at a first temperature whereas at a second, elevated memory temperature said inner sleeve element exerts a relatively low tensile force on said flanges, said inner sleeve element, at said first temperature, being disposed intermediate said flanges with said flanges under tension to increase the spacing therebetween; and, step (d) comprises the step of controlling the temperature of said sleeve member to said memory temperature.

9. A method for assembling a transducer comprising the steps of:

(a) providing a transducer assembly including first and second stators and a proof mass, said proof mass having a mass element suspended for movement within an outer support member, the stators being positioned on opposite sides of the proof mass and including bearing surfaces for bearing on opposite surfaces of said outer support member, said stators further having provided receiving surfaces for receiving an applied preload force;

(b) providing a sleeve member, said sleeve member having a side portion with predeterminedly spaced apart upper and lower flanges projecting therefrom, each flange configured to be joined with one of said stator receiving surfaces, said side portion being formed of a first material having a first coefficient of thermal expansion, said sleeve member further including an inner sleeve element disposed intermediate said flanges, said inner sleeve element being formed of a second material having a second coefficient of thermal expansion;

(c) controlling the temperature of said sleeve member such that said inner sleeve element exerts a tensile stress on said flanges predeterminedly increasing the spacing therebetween;

(d) joining each flange to one of said first and second stators; and (e) controlling the temperature of said sleeve member such that said tensile stress on said flanges is reduced thereby producing a compression force on said flanges tending to reduce the spacing therebetween, said compression force being transmitted to said first and second stators to produce a predetermined preload between said first and second stators and said outer support member.

10. The method of claim 9 wherein:

step (a) includes the step of providing said first and second stators and said proof mass configured generally cylindrically, the assembly of the stators and the proof mass including aligning the longitudinal axes thereof, thereby forming a cylindrical outer surface;

step (b) includes the steps of:

(i) providing said sleeve member configured such that said side portion is arcuate, having a radius substantially equal to the radius of said cylindrical outer surface, (ii) providing said flanges projecting from said side portion into the concave side thereof, the spacing between said flanges being predeterminedly related to the axial length of said axially aligned first and second stators and proof mass, and (iii) providing said inner sleeve element arcuate in shape having substantially the same radius as said side portion, said inner sleeve element being attached to said side portion intermediate said flanges.

11. The method of claim 9 wherein:

step (b) comprises the step of providing said inner sleeve element formed of a material having a higher coefficient of thermal expansion than the coefficient of thermal expansion of said side portion, the inner sleeve element being dimensioned such that at a first temperature said inner sleeve element exerts a relatively high tensile stress on said flanges whereas at a second, reduced temperature said inner sleeve exerts a relatively low tensile stress on said flanges;

step (c) comprises the step of heating said sleeve member to said first temperature; and step (e) comprises the step of cooling said sleeve member to said second temperature.

12. The method of claim 10 wherein:

step (b) comprises the step of providing said inner sleeve element formed of a material having a higher coefficient of thermal expansion than the coefficient of thermal expansion of said side portion, the inner sleeve element being dimensioned such that at a first temperature said inner sleeve element exerts a relatively high tensile stress on said flanges whereas at a second, reduced temperature said inner sleeve exerts a relatively low tensile stress on said flanges;

step (c) comprises the step of heating said sleeve member to said first temperature; and step (e) comprises the step of cooling said sleeve member to said second temperature.

13. The method of claim 11 wherein:

step (a) comprises the further step of providing said inner sleeve element formed of a memory alloy, said memory alloy being preformed to a dimension such that it exerts a relatively low tensile stress on said flanges at said second temperature, whereas at an elevated, memory temperature said metal alloy exerts a relatively high tensile stress on said flanges; and step (c) comprises the step of heating said sleeve member to said memory temperature.

14. The method of claim 12 wherein:

step (a) comprises the further step of providing said inner sleeve element formed of a memory alloy, said memory alloy being preformed to a dimension such that it exerts a relatively low tensile stress on said flanges at said second temperature, whereas at an elevated, memory temperature said metal alloy exerts a relatively high tensile stress on said flanges; and step (c) comprises the step of heating said sleeve member to said memory temperature.

15. The method of claim 9 wherein:

step (b) comprises the step of providing said inner sleeve element formed of a memory alloy having a lower coefficient of thermal expansion than said side portion, said memory alloy being formed to exert a relatively high tensile force on said flanges at a first temperature whereas at a second, elevated memory temperature said memory alloy exerts a relatively low tensile force on said flanges, said inner sleeve element, at said first temperature, being disposed intermediate said flanges with said flanges under tension to increase the spacing therebetween; and, step (e) comprises the step of controlling the temperature of said sleeve member to said memory temperature.

16. The method of claim 10 wherein:

step (b) comprises the step of providing said inner sleeve element formed of a memory alloy having a lower coefficient of thermal expansion than said side portion, said memory alloy being formed to exert a relatively high tensile force on said flanges at a second temperature whereas at a first, elevated, memory temperature said memory alloy exerts a relatively low tensile force on said flanges, said inner sleeve element, at said first temperature, being disposed intermediate said flanges with said flanges under tension to increase the spacing therebetween; and, step (e) comprises the step of controlling the temperature of said sleeve member to said memory temperature.

17. The method of claim 9 wherein:

step (a) comprises the further step of providing said proof mass outer support member with predeterminedly positioned contact portions, said contact portions defining the areas of contact between said proof mass and said first and second stators;

step (b) comprises the step of providing said sleeve member flanges configured to be joined with said receiving surfaces on said first and second stators such that said flanges are axially aligned with said contact portions.

18. The method of claim 17 wherein step (a) comprises the steps of:

(i) providing capacitance plate pick-off areas on opposite sides of said mass element, and (ii) providing said predeterminedly positioned contact portions on an axis that intersects the centroid of said capacitive plate pick-off areas.

19. The method of claim 10 wherein:

step (a) comprises the further steps of:

(i) providing capacitive plate pick-off areas on opposite sides of said mass element, and (ii) providing said proof mass outer support member with contact portions for defining the areas of contact between said proof mass assembly and said first and second stators, said contact portions being predeterminedly positioned on an axis that intersects the centroid of said capacitive plate pick-off areas.

20. The method of claim 19 wherein step (b) comprises the step of providing said sleeve member having said flanges configured to be joined with said receiving surfaces on said first and second stators such that the compression force exerted by said sleeve member on said transducer assembly is axially aligned with said contact portions.

21. A transducer assembly comprising:

a sensor assembly having first and second axially aligned mating sections, each mating section having a receiving surface for receiving an applied clamping force to clamp said mating sections together; and clamping means for applying a controlled compressive axial preload to said mating sections, said clamping means comprising a sleeve member having a side portion with predeterminedly spaced apart upper and lower flanges, each flange configured to be joined with one of said mating section receiving surfaces, said side portion being formed of a first material having a first coefficient of thermal expansion, said sleeve member further including an inner sleeve element disposed intermediate said flanges, said inner sleeve element being formed of a second material having a second coefficient of thermal expansion, said flanges being joined to said mating section receiving surfaces at a first temperature such that said inner sleeve element exerts a tensile stress on said flanges predeterminedly increasing the spacing therebetween, the sleeve member thereafter being controlled to a second temperature such that said tensile stress on said flanges is reduced thereby producing a compression force on said flanges tending to reduce the spacing therebetween, said compression force being transmitted to said first and second mating sections to produce a predetermined preload therebetween.

22. The transducer assembly of claim 21 wherein:
the outer surface of said axially aligned mating sections is generally cylindrical in shape, and
said clamping means sleeve member is configured such that said side portion is arcuate having a radius substantially equal to the radius of said axially aligned mating sections outer surface, and said flanges project from said side member into the concave side thereof.

23. The transducer of claim 21 wherein said inner sleeve element is formed from a material having a higher coefficient of thermal expansion than said side portion, said inner sleeve element being dimensioned such that at said first temperature said inner sleeve exerts a relatively high tensile stress on said flanges whereas at said second, reduced temperature said inner sleeve element exerts a relatively low tensile stress on said flanges.

24. The transducer of claim 23 wherein said inner sleeve element is formed of a memory alloy, said memory alloy being preformed to a dimension such that said inner sleeve element exerts a relatively low tensile stress on said flanges at said second temperature, whereas at an elevated, memory temperature said inner sleeve element exerts a relatively high tensile stress on said flanges.

25. The transducer of claim 22 wherein said inner sleeve element is formed from a material having a higher coefficient of thermal expansion than said side portion, said inner sleeve element being dimensioned such that at said first temperature said inner sleeve exerts a relatively high tensile stress on said flanges whereas at said second, reduced temperature said inner sleeve element exerts a relatively low tensile stress on said flanges.

26. The transducer of claim 25 wherein said inner sleeve element is formed of a memory alloy, said memory alloy being preformed to a dimension such that said inner sleeve element exerts a relatively low tensile stress on said flanges at said second temperature, whereas at an elevated, memory temperature said inner sleeve element exerts a relatively high tensile stress on said flanges.

27. The transducer assembly of claim 21 wherein said inner sleeve element is formed of a memory alloy having a lower coefficient of thermal expansion than said side portion, said memory alloy being preformed to exert a relatively high tensile force on said flanges at said first temperature whereas at a second, elevated memory temperature said inner sleeve element exerts a relatively low tensile force on said flanges.

28. The transducer assembly of claim 22 wherein said inner sleeve element is formed of a memory alloy having a lower coefficient of thermal expansion than said side portion, said memory alloy being preformed to exert a relatively high tensile force on said flanges at said first temperature whereas at a second, elevated memory temperature said inner sleeve element exerts a relatively low tensile force on said flanges.

29. A transducer assembly comprising:
a proof mass including a mass element suspended for movement within an outer support member;
first and second stators, the stators being positioned on opposite sides of said proof mass in axial alignment therewith and including bearing surfaces for bearing on opposite surfaces of said outer support member, said stators having predetermined receiving surfaces for receiving an applied clamping force;
clamping means for applying a controlled compressive axial preload to said first and second stators and said proof mass, said clamping means comprising a sleeve member having a side portion with predeterminedly spaced apart upper and lower flanges projecting therefrom each flange configured to be joined with one of said stator receiving surfaces, said side portion being formed of a first material having a first coefficient of thermal expansion, said sleeve member further including an inner sleeve element disposed intermediate said flanges, said inner sleeve element being formed of a second material having a second coefficient of thermal expansion, said flanges being joined to said stator receiving surfaces at a first temperature such that said inner sleeve element exerts a tensile stress on said flanges predeterminedly increasing the spacing therebetween, the sleeve member thereafter being controlled to a second temperature such that said tensile stress on said flanges is reduced thereby producing a compression force on said flanges tending to reduce the spacing therebetween, said compression force being transmitted to said first and second stators to produce a predetermined preload therebetween.

30. The transducer assembly of claim 29 wherein
the outer surfaces of said proof mass and said stators are generally cylindrical in shape, the assembly of said proof mass and stators presenting a generally cylindrical outer surface, and
wherein said clamping means sleeve member is configured such that said side portion is arcuate having a radius substantially equal to the radius of said transducer assembly cylindrical outer surface, and said flanges project from said side member into the concave side thereof.

31. The transducer assembly of claim 30 wherein said proof mass outer support member is provided with predeterminedly positioned contact pads for defining the contact areas between the stators and the proof mass, and
said flanges and said receiving surfaces on said first and second stators are configured such that the compressive preload transmitted from the sleeve member to said proof mass and stators is axially aligned with said contact areas.

32. The transducer assembly of claim 31 wherein capacitive plate pick-off areas are provided on opposite sides of said mass element, and
wherein said outer support contact pads are aligned with respect to the centroid of said capacitive plate pick-off areas.

33. The transducer of claim 32 wherein said inner sleeve element is formed from a material having a higher coefficient of thermal expansion than said side portion, said inner sleeve exerting a relatively high tensile stress on said flanges at said first temperature whereas at said second, reduced temperature said inner sleeve element exerts a relatively low tensile stress on said flanges.

34. The transducer of claim 29 wherein said inner sleeve element is formed of a memory alloy, said memory alloy being preformed to a dimension such that said inner sleeve element exerts a relatively low tensile stress on said flanges at said second temperature, whereas at an elevated, memory temperature said inner sleeve element exerts a relatively high tensile stress on said flanges.

35. The transducer assembly of claim 31 wherein said inner sleeve element is formed of a memory alloy having a lower coefficient of thermal expansion than said side portion, said memory alloy being preformed to exert a relatively high tensile force on said flanges at said first temperature whereas at a second, elevated memory temperature said inner sleeve element exerts a relatively low tensile force on said flanges.

* * * * *